(12) United States Patent
Pang

(10) Patent No.: US 11,188,184 B2
(45) Date of Patent: Nov. 30, 2021

(54) ELECTROMAGNETIC TOUCH STRUCTURE, DIRECT-BACKLIGHT DISPLAY MODULE AND DISPLAY

(71) Applicants: GUANGZHOU SHIYUAN ELECTRONICS CO., LTD., Guangdong (CN); GUANGZHOU SHIRUI ELECTRONICS CO., LTD., Guangdong (CN)

(72) Inventor: Yuanyang Pang, Guangdong (CN)

(73) Assignees: GUANGZHOU SHIYUAN ELECTRONICS CO., LTD., Guangdong (CN); GUANGZHOU SHIRUI ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/118,333

(22) Filed: Dec. 10, 2020

(65) Prior Publication Data

US 2021/0096673 A1  Apr. 1, 2021

Related U.S. Application Data

(63) Continuation of application No. PCT/CN2018/118461, filed on Nov. 30, 2018.

(30) Foreign Application Priority Data

Jun. 14, 2018 (CN) .......................... 201820927188.8

(51) Int. Cl.
*G06F 3/046* (2006.01)

(52) U.S. Cl.
CPC .... *G06F 3/046* (2013.01); *G06F 2203/04107* (2013.01)

(58) Field of Classification Search
CPC ........... G06F 3/046; G06F 2203/04107; G06F 3/0412; G06F 3/0416
See application file for complete search history.

(56) References Cited

U.S. PATENT DOCUMENTS

| 10,437,359 B1* | 10/2019 | Wang ..................... G06F 1/1643 |
| 2004/0178996 A1* | 9/2004 | Kurashima ............. G06F 3/016 |
| | | 345/173 |

(Continued)

FOREIGN PATENT DOCUMENTS

| CN | 104603731 A | 5/2015 |
| CN | 106980207 A | 7/2017 |

OTHER PUBLICATIONS

International Application No. PCT/CN2018/118461, International Search Report and Written Opinion dated Mar. 13, 2019, 7 pages.

*Primary Examiner* — Ibrahim A Khan
(74) *Attorney, Agent, or Firm* — Zhong Law, LLC

(57) ABSTRACT

The present disclosure discloses an electromagnetic touch structure, a direct-backlight display module and a display. The electromagnetic touch structure includes a frame structure and an electromagnetic screen structure disposed on the rim structure; the frame structure includes a groove-shaped metal rear shell and a rim structure disposed at a peripheral edge of the metal rear shell. The electromagnetic screen structure includes a diffusion panel and an electromagnetic film which are stacked between the metal rear shell and the rim structure, and a permanent magnet structure disposed at a peripheral edge of the electromagnetic film, and the permanent magnet structure is located between the metal rear shell and the rim structure, and the electromagnetic film is disposed above or below the diffusion panel.

20 Claims, 3 Drawing Sheets

(56) References Cited

U.S. PATENT DOCUMENTS

2016/0062460 A1    3/2016  Li
2016/0284497 A1*   9/2016  Stryker .................. H03K 17/96
2017/0277282 A1*   9/2017  Go ........................ G06F 3/0362
2019/0265819 A1*   8/2019  Holland ................ G06F 3/0412

* cited by examiner

ELECTROMAGNETIC TOUCH STRUCTURE, DIRECT-BACKLIGHT DISPLAY MODULE AND DISPLAY

CROSS-REFERENCE TO RELATED APPLICATIONS

This application is a continuation of International Application No. PCT/CN2018/118461, filed on Nov. 30, 2018, which claims priority to Chinese Patent Application No. 201820927188.8, filed on Jun. 14, 2018, both of which are hereby incorporated by reference in their entireties.

TECHNICAL FIELD

The present disclosure relates to the field of display equipment technologies, and in particular, to an electromagnetic touch structure, a direct-backlight display module and a display.

BACKGROUND

In traditional technical solutions, when the electromagnetic touch technology is applied to large-format touch all-in-one machines (larger than 40 inches), especially when a display screen module is designed with a direct-backlight module, because an edge of the metal rear shell of the display screen module is close to the electromagnetic antenna, electromagnetic signals at the edge of the display screen will be partially shielded by the metal rear shell during electromagnetic writing, resulting in reduced magnetic flux of the electromagnetic coil of the electromagnetic antenna at the edge of the metal rear shell, causing that it is difficult to recognize a writing signal, and the display cannot be used normally at the edge of the display when writing or controlling with an electromagnetic writing stylus (for example, problems such as a line being broken and a line being unable to be drawn may occur).

SUMMARY

Based on this, in view of the above-identified problems, the present disclosure provides an electromagnetic touch structure, a direct-backlight display module and a display, which can strengthen electromagnetic signals shielded by the metal rear shell and can properly recognize touching or writing signals.

The technical solution is as follows:

An electromagnetic touch structure includes a rim structure, and an electromagnetic screen structure disposed on the rim structure;

the frame structure includes a metal rear shell in a groove shape and a rim structure circumferentially disposed at a peripheral edge of the metal rear shell;

the electromagnetic screen structure includes a diffusion panel and an electromagnetic film which are stacked between the metal rear shell and the rim structure, and a permanent magnet structure disposed at a peripheral edge of the electromagnetic film, and the permanent magnet structure is located between the metal rear shell and the rim structure, and the electromagnetic film is disposed above or below the diffusion panel.

In a traditional technical solution, because the peripheral edges of the electromagnetic film and the electromagnetic screen structure are disposed between the metal rear shell and the rim structure, a distance between an electromagnetic antenna module corresponding to the electromagnetic film and the metal rear shell is relatively close. As a result, the metal rear shell and the rim structure form an electromagnetic shielding to the edge part of the electromagnetic screen structure located between them, resulting in reduced magnetic flux of an electromagnetic coil of the electromagnetic antenna module at the edge of the metal rear shell. In the present application, by setting a permanent magnet structure at the edge part of the electromagnetic screen structure, the magnetic flux of some coils of the electromagnetic antenna module at the edge position can be strengthened, thereby weakening or eliminating the electromagnetic signal shielding caused by the metal rear shell and the rim structure to the electromagnetic film and the electromagnetic screen structure, and thus enabling the electromagnetic signal to be properly identified even at the edge position of the electromagnetic screen structure when electromagnetic writing is performed by using the electromagnetic screen structure, and ensuring normal use of the electromagnetic screen structure.

Further technical solutions are described below:

Further, the permanent magnet structure includes silicon steel sheets or a selenium steel sheets.

Further, the metal rear shell includes a groove-shaped rear shell main body and a rear shell edge part disposed on a periphery of the rear shell main body; the electromagnetic film includes a film main body suspended above the rear shell main body, and a film edge part disposed on a periphery of the film main body and corresponding to the rear shell edge part, and the permanent magnet structure is disposed between the film edge part and the rear shell edge part.

Further, the permanent magnet structure includes a permanent magnet main body disposed between the film edge part and the rear shell edge part, and further includes a permanent magnet connecting part connected to the permanent magnet main body and extended to an interior of the rear shell main body.

Further, the permanent magnet structure includes a permanent magnet main body disposed between the film edge part and the rear shell edge part, and further includes a permanent magnet auxiliary body located between the film edge part and the rim structure, and the permanent magnet main body and the permanent magnet auxiliary body are respectively wrapped on two sides of the film edge part.

Further, the permanent magnet main body and the permanent magnet auxiliary body are disposed in a mutually independent manner;

or, the permanent magnet main body is extended around an end of the film edge part and is connected to the permanent magnet auxiliary body.

Further, the electromagnetic touch structure also includes a reflector disposed inside the metal rear shell and corresponding to the diffusion panel, and the permanent magnet structure is disposed between the metal rear shell and the reflector.

Further, the electromagnetic screen structure also includes a display screen body disposed in the rim structure, and the display screen body corresponds to the electromagnetic film.

In addition, the present disclosure also provides a direct-backlight display module, which includes the electromagnetic touch structure as described above.

In addition, the present disclosure also provides a display, which includes the direct-backlight display module as described above.

The present disclosure has following beneficial effects: by adding a permanent magnet structure (such as selenium (silicon) steel sheets) on the peripheral edge of the electromagnetic touch structure, the magnetic flux of the coil at the edge part of the electromagnetic antenna module corresponding to the edge of the metal rear shell can be strengthened, so that the signal responsive to electromagnetic writing at the edge can be improved in the application scenario, thereby mitigating the problem of abnormality in writing at the edge.

DESCRIPTION OF REFERENCE SIGNS

Figure 1:
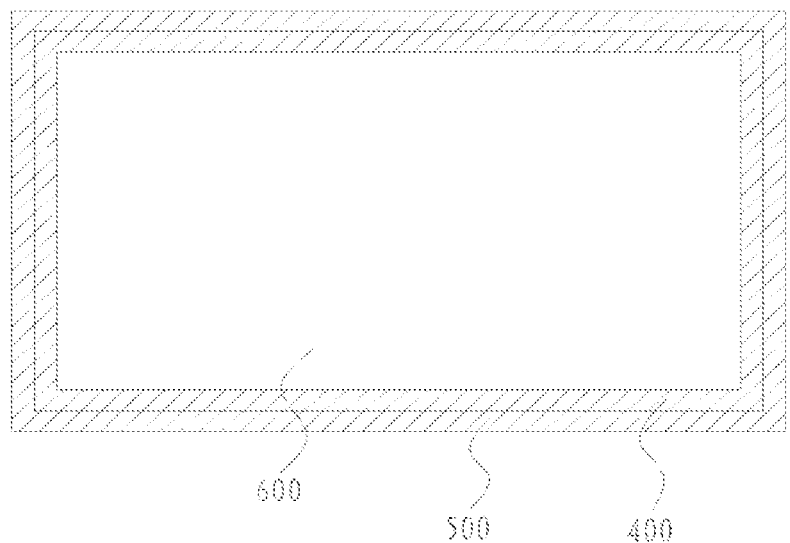
FIG. 1 is a schematic block diagram of a cutaway view of an electromagnetic touch structure according to an embodiment of the present disclosure.

100—metal rear shell, 110—rear shell main body, 120—rear shell edge part, 200—rim structure, 210—frame main body, 220—positioning slot, 300—diffusion panel, 400—electromagnetic film, 410—film main body, 420—film edge part, 500—permanent magnet structure, 510—permanent magnet main body, 520—permanent magnet connecting part, 530—permanent magnet auxiliary body, 600—display screen body.

DETAILED DESCRIPTION

Embodiments of the present disclosure are described in detail below, and examples of the embodiments are shown in the drawings, where same labels in respective drawings represent same parts. The embodiments described below with reference to the drawings are illustrative and are used only to explain the present disclosure and should not be understood as limitation to the present disclosure.

Figure 2:
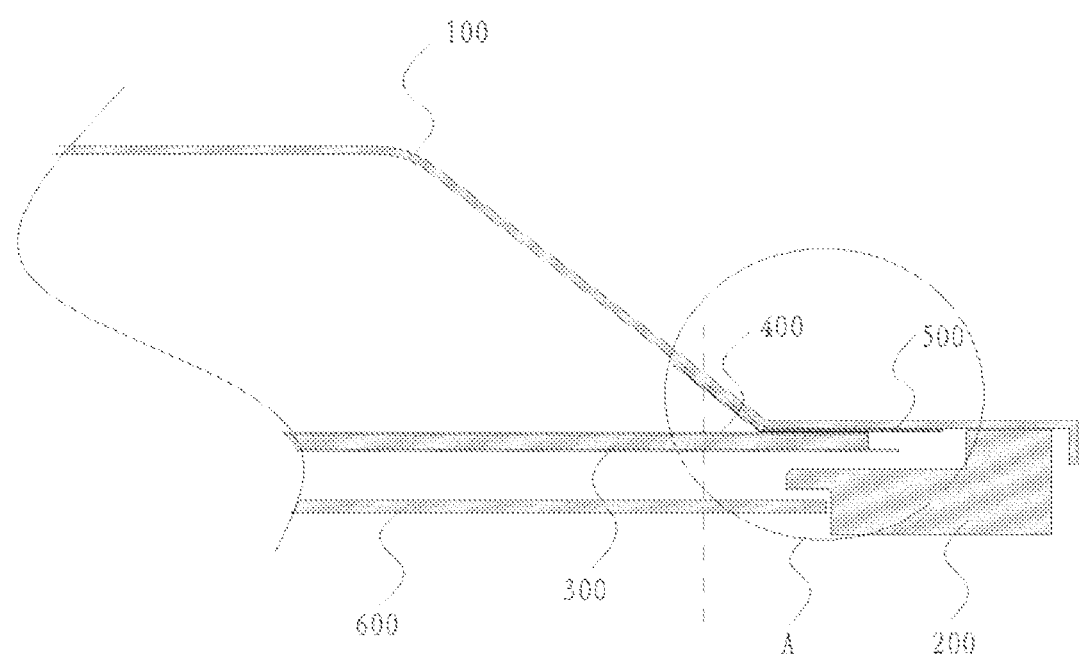
FIG. 2 is a schematic block diagram of a cross-sectional structure of an electromagnetic touch structure according to some embodiments of the present disclosure.

As shown in FIGS. 1 and 2, embodiments of the disclosure provide an electromagnetic touch structure, including a frame structure and an electromagnetic screen structure disposed on the frame structure. The frame structure can provide support and fixation for the electromagnetic screen structure, and the electromagnetic screen structure can realize electromagnetic writing and control functions.

Figure 3:
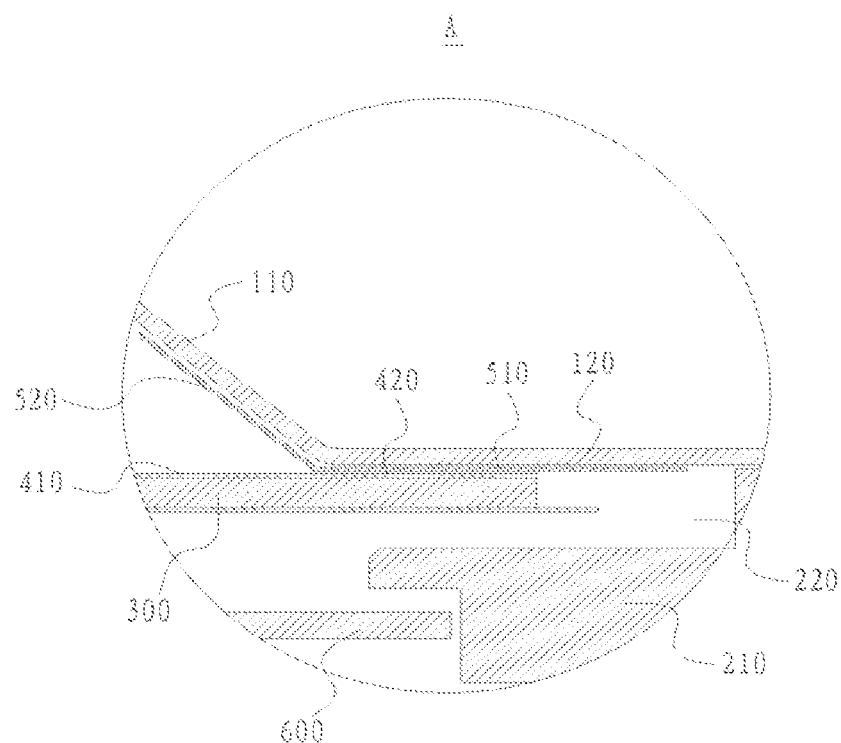
FIG. 3 is an enlarged regional schematic diagram of part A of FIG. 2.

In particular, as shown in FIG. 3, the above-referenced frame structure includes a groove-shaped metal rear shell 100 (that is, the metal rear shell 100 protrudes outward) and a rim structure 200 disposed at a peripheral edge of the metal rear shell 100. An edge of the electromagnetic screen structure is disposed on the metal rear shell 100, a middle part of the electromagnetic screen structure corresponds to a groove in the middle of the metal rear shell, and the rim structure 200 provides peripheral positioning and fixing of the electromagnetic screen structure, so that the electromagnetic screen structure is fixed on the frame structure. Further, the metal rear shell 100 includes a groove-shaped rear shell main body 110, and a rear shell edge part 120 disposed on a periphery of the rear shell main body, and the peripheral edge of the electromagnetic screen structure is disposed on the rear shell edge part 120, and the middle part of the electromagnetic screen structure is suspended above the rear shell main body 110. In addition, the rim structure 200 includes a frame main body 210 disposed on the rear shell edge part 120, and a positioning slot 220 disposed on the frame main body 210. The positioning slot 220 is located between the frame main body 210 and the rear shell edge part 120, while the peripheral edge of the electromagnetic screen structure is located in the positioning slot 220, thereby realizing the positioning and fixing of the electromagnetic screen structure.

Moreover, the electromagnetic screen structure includes a diffusion panel 300 and an electromagnetic film 400 which are stacked between the metal rear shell 100 and the rim structure 200. The electromagnetic film 400 may be disposed above the diffusion panel 300 (that is, on a side of the diffusion panel away from the metal rear shell 100) or below the diffusion panel 300 (that is, on a side of the diffusion panel facing the metal rear shell 100). Moreover, surrounding edges of the diffusion panel 300 and the electromagnetic film 400 are disposed in the positioning slot 220 between the metal rear shell 100 and the rim structure 200 to realize the fixation of the diffusion panel 300 and the electromagnetic film 400.

In addition, the electromagnetic screen structure also includes a permanent magnet structure 500 disposed at a peripheral edge of the electromagnetic film 400, and the permanent magnet structure 500 is located between the metal rear shell 100 and the rim structure 200. In a traditional technical solution, because the peripheral edges of the electromagnetic film 400 and the electromagnetic screen structure are disposed between the metal rear shell 100 and the rim structure 200, the distance between the electromagnetic antenna module corresponding to the electromagnetic film 400 and the metal rear shell 100 is relatively close. As a result, the metal rear shell 100 and the rim structure 200 form an electromagnetic shielding to the edge part of the electromagnetic screen structure located between them, resulting in reduced magnetic flux of an electromagnetic coil of the electromagnetic antenna module at an edge position of the metal back case 100. In the present disclosure, by setting a permanent magnet structure 500 at the edge part of the electromagnetic screen structure, the magnetic flux of some coils of the electromagnetic antenna module corresponding to the edge position of the electromagnetic screen structure can be strengthened, thereby reducing or eliminating the electromagnetic signal shielding by the metal rear shell 100 and the rim structure 200 to the electromagnetic film 400 and the electromagnetic screen structure, and thus enabling the electromagnetic signal to be properly identified even at the edge position of the electromagnetic screen structure when electromagnetic writing is performed by using the electromagnetic screen structure, and ensuring normal use of the electromagnetic screen structure.

Further, the electromagnetic film 400 includes a film main body 410 suspended above the rear shell main body 110, and a film edge part 420 disposed on a periphery of the film main body 410 and corresponding to the rear shell edge part 120. The permanent magnet structure 500 is disposed between the film edge part 420 and the rear shell edge part 120, and the film edge part 420 is also located in the positioning slot 220 between the rear shell edge part 120 and the frame main body 210. That is, the electromagnetic capacity of the film edge part 420 of the electromagnetic film 400 located between the rear shell edge part 120 and the frame main body 210 can be enhanced by the permanent magnet structure 500, and the magnetic flux of some coils of the electromagnetic antenna module at the film edge part 420 can be strengthened, and the electromagnetic signal shielding of the metal rear shell 100 and the rim structure 200 to the film edge part 420 can be reduced or eliminated, so that the film edge part 420 can also identify an electromagnetic signal properly, and thus, the whole electromagnetic film 400 can identify the electromagnetic signal properly, thereby ensuring normal operation of the whole electromagnetic touch structure.

Furthermore, as shown in FIGS. 2 and 3, in some embodiments, the permanent magnet structure 500 includes a permanent magnet main body 510 disposed between the film edge part 420 and the rear shell edge part 120, and further incudes a permanent magnet connecting part 520 connected to the permanent magnet main body 510 and extended to an interior of the rear shell main body 110 (that is a side facing the diffusion panel 300). Setting the permanent magnet connecting part 520 facilitates positioning and fixation of the entire permanent magnet structure 500. Setting the permanent magnet main body 510 located at the film edge part 420 facilitates enhancement of the electromagnetic performance of the film edge part 420. Moreover, the permanent main body 510 is partially extended to the film main body 410, ensuring the electromagnetic performance of the connection transition between the film main body 410 and the film edge part 420. In addition, in this case, the electromagnetic film 400 may be disposed under the diffusion panel 300, that is, the electromagnetic film 400 is disposed on a side facing the metal rear shell 100.

Figure 4:
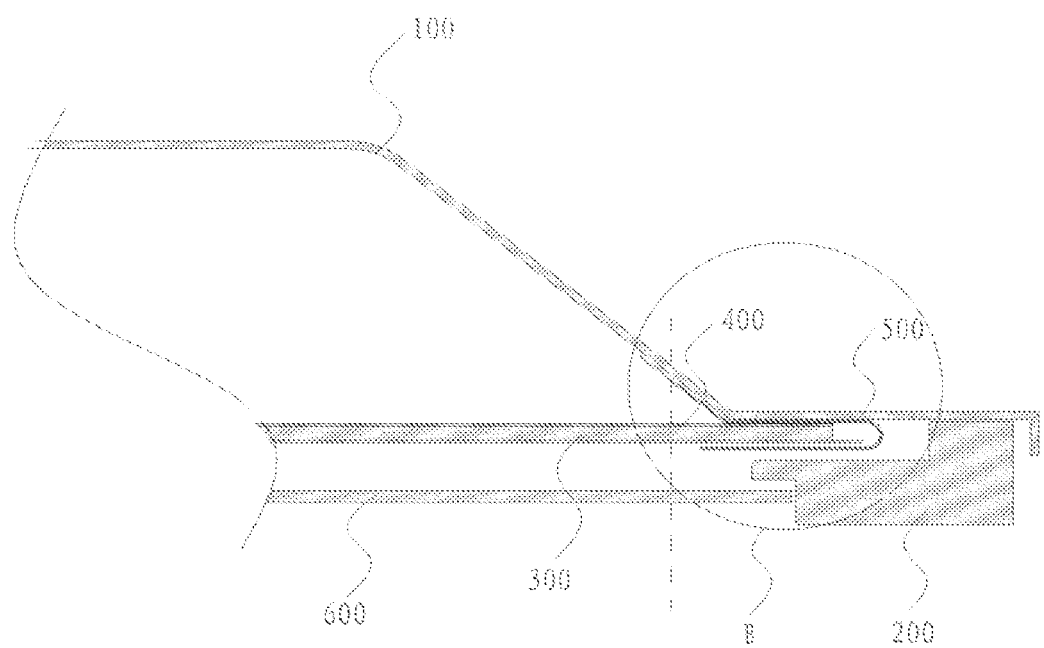
FIG. 4 is a schematic block diagram of a cross-sectional structure of an electromagnetic touch structure according to some other embodiments of the present disclosure.
Figure 5:
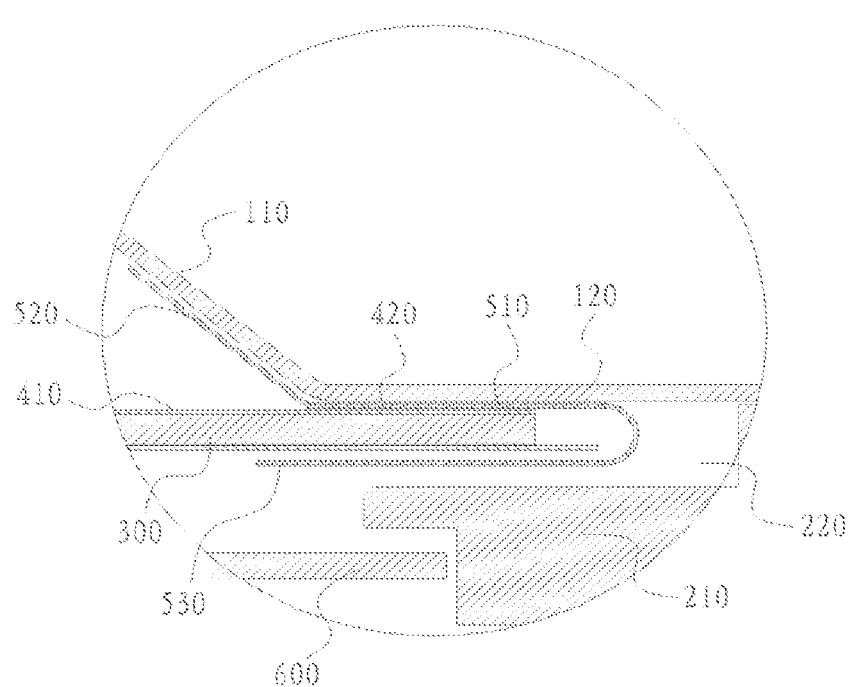
FIG. 5 is an enlarged regional schematic diagram of part B of FIG. 4.

In addition, as shown in FIGS. 4 to 5, in some other embodiments, the permanent magnet structure 500 includes not only the permanent magnet main body 510 disposed between the film edge part 420 and the rear shell edge part 120, but also a permanent magnet auxiliary body 530 located between the film edge part 420 and the rim structure 200, and the permanent magnet main body 510 and the permanent magnet auxiliary body 530 are respectively wrapped on both sides of the film edge part 420. By setting a permanent magnet structure 500 on both sides of the film edge part 420, the electromagnetic capacity of the film edge part 420 can be enhanced from both sides, so that the film edge part 420 can better identify the electromagnetic signal. Furthermore, the permanent magnet main body 510 and the permanent magnet auxiliary body 530 both partially extend to the film main body 410, ensuring the electromagnetic performance of the connection transition between the film main body 410 and the film edge part 420. In addition, in this case, the electromagnetic film 400 may be disposed below or above the diffusion panel 300. Moreover, the permanent magnet main body 510 and the permanent magnet auxiliary body 530 may be disposed in a mutually independent manner, that is, they are respectively disposed on both sides of the film edge part 420; or, the permanent magnet main body 510 may be extended around an end of the film edge part 420 and connected to the permanent magnet auxiliary body 530, that is, the permanent magnet structure 500 may be set into a U-shaped structure to wrap on both sides of the film edge part 420.

In addition, the permanent magnet structure 500 may be provided as silicon steels sheet or selenium steel sheets, which have excellent electromagnetic capability and can significantly enhance the electromagnetic performance at the edge position of the electromagnetic film 400. Moreover, the permanent magnet structure 500 may be set as an integral structure, that is, an integral frame structure designed according to the peripheral edge shapes of the metal rear shell 100 and the rim structure 200. In addition, the permanent magnet structure 500 may also be set as a split structure, that is, the permanent magnet structure 500 may be set as multiple silicon steel sheets or selenium steel sheets, which are respectively disposed at the peripheral edges of the metal rear shell 100 and the rim structure 200.

In addition, the electromagnetic touch structure also includes a reflector disposed inside the metal rear shell 100 and corresponding to the diffusion panel 300, and the permanent magnet structure 500 is disposed between the metal rear shell 100 and the reflector. In this way, the permanent magnet structure 500 will not affect the optical performance of the electromagnetic touch structure.

In addition, the electromagnetic screen structure may also include a display screen body 600 disposed in the rim structure 200, where the display screen body 600 corresponds to the electromagnetic film 400. By setting the display screen body 600, the electromagnetic screen structure can realize not only the electromagnetic touch function, but also the display function. In addition, in the present embodiment, the rim structure 200 may be made of a metal material or a plastic material, or other materials as needed.

In addition, the present disclosure also provides a direct-backlight display module, which includes the electromagnetic touch structure as described above. In addition, the present disclosure also provides a display, which includes the direct-backlight display module as described above. In this way, by adding permanent magnet structures (such as selenium (silicon) steel sheets) at the peripheral edge of the electromagnetic touch structure, the magnetic flux of edge part coils of the electromagnetic antenna module located at the edge of the metal rear shell is enhanced, so that the signal response to electromagnetic writing at the edge is improved in the application scenario, and the problem of abnormality in writing at the edge is improved, and thus the writing and touch functions of the electromagnetic touch structure can be normally used at the edge of the display.

In addition, it should be understood that in the embodiments, the terms "lower", "upper", "front", "rear", "left", "right", "inside", "outside", "top", "bottom", "one side", "the other side", "one end", "the other end", etc., are based on the position relationship shown in the accompanying drawings; the terms "first" and "second" are used to distinguish different structural components. These terms are only intended to facilitate describing the present disclosure and simplifying the description, and should not be understood as limitations to the disclosure.

The technical features of the above-mentioned embodiments may be combined arbitrarily. In order to make the description concise, all possible combinations of the various technical features in the embodiments are not described. However, as long as there is no contradiction between the combinations of these technical features, they should be considered as within the scope recorded in this specification.

The above-mentioned embodiments only express several embodiments of the present disclosure, and their descriptions are specific and detailed, but they cannot be understood as a limitation on the scope of the present disclosure. It should be pointed out that, for ordinary technicians in the art, various deformations and improvements can be made without departing from the concept of the present disclosure, which all belong to the scope of protection of the present disclosure. Therefore, the scope of protection of the patent for the disclosure shall be based on the attached claims.

What is claimed is:

1. An electromagnetic touch structure, comprising a frame structure, and an electromagnetic screen structure disposed on the frame structure;

the frame structure comprising a groove-shaped metal rear shell and a rim structure circumferentially disposed at a peripheral edge of the metal rear shell;

the electromagnetic screen structure comprising a diffusion panel and an electromagnetic film which are stacked between the metal rear shell and the rim structure, and a permanent magnet structure disposed at a peripheral edge of the electromagnetic film, the permanent magnet structure being located between the metal rear shell and the rim structure, and the electromagnetic film being disposed above or below the diffusion panel.

2. The electromagnetic touch structure according to claim 1, wherein the permanent magnet structure is provided as a silicon steel sheet.

3. The electromagnetic touch structure according to claim 2, wherein the electromagnetic touch structure further comprises a reflector disposed inside the metal rear shell and corresponding to the diffusion panel, and the permanent magnet structure is disposed between the metal rear shell and the reflector.

4. The electromagnetic touch structure according to claim 2, wherein the electromagnetic screen structure further comprises a display screen body disposed in the rim structure, and the display screen body corresponds to the electromagnetic film.

5. The electromagnetic touch structure according to claim 1, wherein the metal rear shell comprises a groove-shaped rear shell main body and a rear shell edge part disposed on a periphery of the rear shell main body, and the electromagnetic film comprises a film main body suspended above the rear shell main body, and a film edge part disposed on a periphery of the film main body and corresponding to the rear shell edge part, and the permanent magnet structure is disposed between the film edge part and the rear shell edge part.

6. The electromagnetic touch structure according to claim 5, wherein the permanent magnet structure comprises a permanent magnet main body disposed between the film edge part and the rear shell edge part, and further comprises a permanent magnet connecting part connected to the permanent magnet main body and extended to an interior of the rear shell main body.

7. The electromagnetic touch structure according to claim 6, wherein the permanent magnet structure comprises a permanent magnet main body disposed between the film edge part and the rear shell edge part, and further comprises a permanent magnet auxiliary body located between the film edge part and the rim structure, and the permanent magnet main body and the permanent magnet auxiliary body are respectively wrapped on two sides of the film edge part.

8. The electromagnetic touch structure according to claim 7, wherein the permanent magnet main body and the permanent magnet auxiliary body are disposed in a mutually independent manner.

9. The electromagnetic touch structure according to claim 7, wherein the permanent magnet main body is extended around an end of the film edge part and is connected to the permanent magnet auxiliary body.

10. The electromagnetic touch structure according to claim 5, wherein the permanent magnet structure comprises a permanent magnet main body disposed between the film edge part and the rear shell edge part, and further comprises a permanent magnet auxiliary body located between the film edge part and the rim structure, and the permanent magnet main body and the permanent magnet auxiliary body are respectively wrapped on two sides of the film edge part.

11. The electromagnetic touch structure according to claim 10, wherein the permanent magnet main body and the permanent magnet auxiliary body are disposed in a mutually independent manner.

12. The electromagnetic touch structure according to claim 10, wherein the permanent magnet main body is extended around an end of the film edge part and is connected to the permanent magnet auxiliary body.

13. The electromagnetic touch structure according to claim 5, wherein the electromagnetic touch structure further comprises a reflector disposed inside the metal rear shell and corresponding to the diffusion panel, and the permanent magnet structure is disposed between the metal rear shell and the reflector.

14. The electromagnetic touch structure according to claim 5, wherein the electromagnetic screen structure further comprises a display screen body disposed in the rim structure, and the display screen body corresponds to the electromagnetic film.

15. The electromagnetic touch structure according to claim 1, wherein the electromagnetic touch structure further comprises a reflector disposed inside the metal rear shell and corresponding to the diffusion panel, and the permanent magnet structure is disposed between the metal rear shell and the reflector.

16. The electromagnetic touch structure according to claim 1, wherein the electromagnetic screen structure further comprises a display screen body disposed in the rim structure, and the display screen body corresponds to the electromagnetic film.

17. A direct-backlight display module, comprising an electromagnetic touch structure, wherein the electromagnetic touch structure comprises a frame structure, and an electromagnetic screen structure disposed on the frame structure;

the frame structure comprising a groove-shaped metal rear shell and a rim structure circumferentially disposed at a peripheral edge of the metal rear shell;

the electromagnetic screen structure comprising a diffusion panel and an electromagnetic film which are stacked between the metal rear shell and the rim structure, and a permanent magnet structure disposed at a peripheral edge of the electromagnetic film, the permanent magnet structure being located between the metal rear shell and the rim structure, and the electromagnetic film being disposed above or below the diffusion panel.

18. The direct-backlight display module according to claim 17, wherein the permanent magnet structure is provided as a silicon steel sheet.

19. The direct-backlight display module according to claim 17, wherein the metal rear shell comprises a groove-shaped rear shell main body and a rear shell edge part disposed on a periphery of the rear shell main body, the electromagnetic film comprises a film main body suspended above the rear shell main body, and a film edge part disposed on a periphery of the film main body and corresponding to the rear shell edge part, and the permanent magnet structure is disposed between the film edge part and the rear shell edge part.

20. A display, comprising a direct-backlight display module, wherein the direct-backlight display module comprises an electromagnetic touch structure, wherein the electromagnetic touch structure comprises a frame structure, and an electromagnetic screen structure disposed on the frame structure;

the frame structure comprising a groove-shaped metal rear shell and a rim structure circumferentially disposed at a peripheral edge of the metal rear shell;

the electromagnetic screen structure comprising a diffusion panel and an electromagnetic film which are stacked between the metal rear shell and the rim structure, and a permanent magnet structure disposed at a peripheral edge of the electromagnetic film, the permanent magnet structure being located between the metal rear shell and the rim structure, and the electromagnetic film being disposed above or below the diffusion panel.

* * * * *